United States Patent Office 3,168,331
Patented Feb. 2, 1965

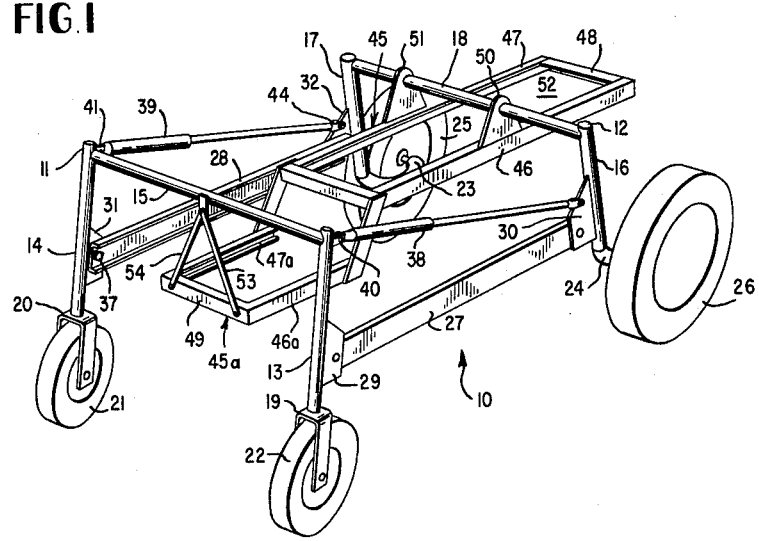

3,168,331
VEHICLE FRAME
Cyril Rodney Johnson, Clarion, Iowa, assignor to Hagie Manufacturing Company, Clarion, Iowa, a corporation of Iowa
Filed Aug. 14, 1962, Ser. No. 216,924
9 Claims. (Cl. 280—106.5)

This invention relates to agricultural implements generally and more particularly to an improved vehicle frame of considerable height particularly adaptable for use in tractors and similar self-propelled agricultural vehicles.

Recent advances in the field of agriculture have led to the development of improved mechanized equipment capable of performing a wide variety of agricultural tasks which have previously been accomplished by manual labor. Included within this group of recently developed equipment are various agricultural vehicles having body sections which are mounted at a considerable height above the ground so that the vehicle is enabled to move down rows of tall growing plants without doing damage to these plants. Generally, in agricultural vehicles of this nature, the body of the vehicle is supported high above a spaced wheel assembly by a suitable frame structure so that the wheels of the vehicle are enabled to straddle a row of plants as the vehicle moves down the row. This frame structure is subjected to extreme stress, which is partially due to the spaced configuration of the wheels, as the uneven terrain normally encountered by a vehicle of this type causes each wheel to attempt to shift relative to the remaining wheels. Also, the vehicle body, motor, operators, and additional equipment is usually supported at the upper portion of the frame structure so that the primary weight of the vehicle is applied to the upper extremities of the frame and is experienced throughout the frame.

The frame structures previously utilized with high clearance agricultural vehicles have included a plurality of rigid bracing members to impart strength to the over-all frame construction. However, the rigid bracing construction previously used has proved inadequate, as rigid braces often tend to shear or break under the stresses to which the frame of an agricultural vehicle is subjected. For example, in previous high clearance agricultural vehicles, the spaced front wheel assembly was often connected to the rear wheel assembly by rigid side braces. When one of the front wheels of a vehicle of this nature passes over a raised or depressed portion in the ground, the tendency of the front wheel assembly is to tilt in a direction longitudinally of the vehicle frame, thereby causing resultant stresses which shear the connections of the front wheel assembly from the rigid side rails or braces.

It is a primary object of this invention to provide an improved frame structure of improved strength and durability for high clearance agricultural vehicles.

It is another object of this invention to provide an improved frame structure for high clearance agricultural vehicles which includes pivoted frame connections to absorb the stresses to which the frame is subjected.

A still further object of this invention is to provide an improved frame for high clearance agricultural vehicles which incorporates pivoted side rails combined with spring biased braces to absorb the stresses to which the vehicle is subjected.

The above and further objects and details of this invention will be readily apparent upon a consideration of the following specification taken with the accompanying drawings in which:

FIGURE 1 is a perspective view illustrating the frame structure for high clearance agricultural vehicles of the present invention, FIGURE 2 is a diagrammatic illustration of the frame of FIGURE 1 showing the pivotal connections of said frame; and FIGURE 3 is a partially sectioned plan view of a compression side brace shown in FIGURE 1.

Referring now to the drawings, the frame structure for high clearance agricultural vehicles of the present invention indicated generally at 10 includes a front wheel support assembly 11 and a rear wheel support assembly 12 of inverted U-shape. Front wheel support assembly 11 includes a pair of elongated upright supports 13 and 14 held in spaced relationship by a cross-arm 15 which is integrally connected to the upper extremities of the upright supports 13 and 14, while the rear wheel support assembly 12 includes a pair of elongated upright supports 16 and 17 held in spaced relationship by a cross-arm 18 which is integrally connected to the upper extremities of the upright supports 16 and 17. The lower extremities of the front upright supports 13 and 14 are connected to forked wheel mounts 19 and 20 which mount front wheels 21 and 22. The lower extremities of the rear upright supports 16 and 17 are connected to stub axle mounting units 23 and 24 which mount rear wheels 25 and 26. When the frame 10 is utilized with a self-propelled agricultural vehicle, the rear wheels 25 and 26 are preferably of a larger diameter than the front wheels 21 and 22.

The integrally formed front wheel support assembly 11 is secured in spaced relationship with the integrally formed rear wheel support assembly 12 by horizontal side rails 27 and 28 which are preferably of a channel construction. Side rail 27 is connected to a support plate 29 which is secured to upright support 13 and to a support plate 30 which is secured to upright support 16. In like manner, side rail 28 is connected to a support plate 31 which is secured to upright support 14 and a support plate 32 which is secured to upright support 17. It should be noted that the support plates 29, 30, 31 and 32 are positioned adjacent the lower extremities of the upright supports 13, 14, 16 and 17, and that the connection between the support plates and the side braces 27 and 28 is accomplished by means of a single connecting device so that pivotal connections are provided. These pivotal connections are indicated at 33, 34, 35 and 36 in FIGURE 2. The pivotal connection between the side braces 27 and 28 and the support plates 29, 30, 31 and 32 may be accomplished by means of single connecting bolts of the type indicated at 37 in FIGURE 1, or other suitable means capable of providing a pivotal connection may be utilized.

Also extending between the front wheel support assembly 11 and the rear wheel support assembly 12 are compression side braces 38 and 39 which consist of telescopic members relatively arranged for sliding movement through limited distances. The upper ends of the compression side braces 38 and 39 are pivotally connected at points 40 and 41 to the upper extremities of the upright supports 13 and 14 adjacent the cross-arm 15. The compression side braces 38 and 39 extend diagonally rearward and downward from the pivotal connections 40 and 41 and are pivotally secured to the support plates 30 and 32 at pivot points 42 and 43 in FIGURE 2. The pivot points 42 and 43 are positioned adjacent the pivotal connections between the support plates 30 and 32 and the side rails 27 and 28, and the pivotal connections between the support plates 30 and 32 and the compression side braces 38 and 39 may be accomplished by means of a connector nut and bolt assembly 44, or by any other suitable means. Thus, it may be observed that the front wheel support asembly 11 is held in spaced relationship with the rear wheel support assembly 12 by pivotally connected rail and brace units 27 and 28, 38 and 39.

A body support frame assembly indicated generally at 45 in FIGURE 1 and shown by dotted lines in FIGURE 2 is suspended below the cross-arms 15 and 18 of the front and rear wheel support assemblies 11 and 12. The configuration of the body support frame assembly 45 will vary in accordance with the particular variety of vehicle body to be mounted upon the frame structure 10, and therefore, the frame structure 10 is adapted for use with a wide variety of body support frames. Basically, as illustrated by the dotted lines of FIGURE 2, the body support frame 45 will consist of parallel side frame bars 46 and 47 which are rigidly held in spaced relationship by cross bars 48 and 49. The body support frame assembly 45 is rigidly supported from the cross-arm 18 of the rear wheel support assembly 12 by support members 50 and 51 which may constitute any suitable rigid connecting means secured to the side bars 46 and 47 and the cross-arm 18. It must be noted that the support members 50 and 51 are secured to the side bars 46 and 47 inwardly of the cross bar 48 so that the rear portion of the body support frame 45 projects rearwardly of the rear wheel support assembly 12 to provide an overhanging section 52.

The front portion of the body support frame assembly 45 is secured to the cross arm 15 of the front wheel assembly 11 by means of diagonal supports 53 and 54. One end of the diagonal supports 53 and 54 is pivotally connected at points 55 and 56 to the cross bar 49 of the support frame assembly 45, and the opposite ends of the diagonal supports are pivotally connected at a common pivot point 57 to the cross-arm 15 of the front wheel support assembly 11. The weight supported by the common pivot point 57 is not excessive, for the body support frame assembly 45 is positioned within the frame structure 10 so that the overhanging section 52 insures that the support frame assembly 45 is suspended in a substantially balanced condition from the cross-arm 18 of the rear wheel support assembly 12. This minimizes the weight applied to the common pivot point 57.

The body support frame assembly 45 illustrated by FIGURE 1 is particularly adapted for use with self-propelled agricultural vehicles such as tractors and the like. In the innovation illustrated by FIGURE 1, the front portions of the side bars 46 and 47 of the body support frame assembly 45 are separated to form short side bars indicated as 46a and 47a. These shortened side bars 46a and 47a, in conjunction with cross bar 49, form a front body frame section 45a which is secured in a position beneath the main side bars 46 and 47 by support arms 58 and 59 extending between the main side bars 46 and 47 and the short side bars 46a and 47a. The lowered front body frame section 45a is capable of supporting any suitable propulsion motor means, while the remaining body of a tractor or other self-propelled vehicle is supported by the side arms 46 and 47. The overhanging section 52 acts as a counterbalance for the weight of the motor supported by front body frame section 45a.

A better understanding of the constructional features of the compression side braces 38 and 39 of FIGURE 1 may be obtained from a consideration of FIGURE 3, which provides a detailed illustration of one of the side braces of FIGURE 1. The compression side braces 38 and 39 of FIGURE 1 are similar in construction, and therefore the description of side brace 38 of FIGURE 3 is applicable to both. Preferably, compression side brace 38 consists of a pair of telescopic tubular sections 60 and 61. Tubular section 60 is designed to slide freely within section 61, and the outer end 62 thereof is provided with a bracket 63 which may be pivotally connected to either of the support plates 30 or 32 of the rear wheel support assembly 12. The opposite end of the tubular section 60, indicated at 64, is closed by an end wall 65 which is provided with an aperture 66. Extending through the aperture 66 is a rod 67 which may be held within the telescopic section 60 by means of a nut 68. Rod 67 is capable of movement within the aperture 66, and the end of the rod which projects through the aperture 66 into the telescopic section 60 is threaded to receive the nut 68 so that the nut may abut the inner surface of end wall 65.

Telescopic section 61, which is larger in diameter than telescopic section 60 is provided with an open end 69 to receive the section 60. The opposite end 70 of the telescopic section 61 is closed by an end wall 72 having an aperture 73 through which the rod 67 also extends. Rod 67 may be held within the telescopic section 61 by a nut 74 which is threaded onto the projecting end of the rod 67 so as to abut the outer surface of the end wall 72. Rod 67 is surrounded by a compression spring 75 which abuts the inner surface of end wall 72 and the outer surface of end wall 65, and a bracket 76 is secured to the rod 67 outwardly of the nut 74 to facilitate the pivotal attachment of the compression side brace 38 to the upright support unit 13 of the front wheel support assembly 11.

The frame structure 10 of the present invention operates effectively to absorb forces which arise when the wheels 21, 22, 25 and 26 encounter terrain irregularities. For example, if the front wheel 21 should pass over a raised or depressed area in the ground, the tendency of the front wheel support assembly 11 is to tilt in a direction longitudinally of the body support frame assembly 45. This tendency to tilt, would normally result in the shearing or breaking of the connections between the front wheel support assembly 11, the side rails 27 and 28, and the side braces 38 and 39. However, in the frame structure 10 of the present invention, the pivotal connections between the front and rear wheel support assemblies 11 and 12, the side rails 27 and 28, and the compression side braces 38 and 39 do not shear under the stresses which occur when the vehicle encounters irregular terrain. Instead, these connections are capable of limited pivotal movement, and any stress arising from the tendency of the front and rear wheel support assemblies 11 and 12 to move longitudinally of the body support frame assembly 45 is applied as a longitudinal force to the compression side braces 38 and 39. Upon the receipt of such forces, the telescopic section 60 is caused to move within the telescopic section 61 against the bias of compression spring 65. Thus, by virtue of the pivoted construction of the frame structure 10 and the contractible action of the compression side braces 38 and 39, forces which would generally cause the shearing or breaking of the connections between the components of the frame structure 10 are effectively absorbed.

It will be readily apparent to those skilled in the art that this invention provides a novel and improved frame structure for high clearance agricultural vehicles which is capable of effectively absorbing the structural stresses to which such vehicles are normally subjected while travelling over rough terrain. The arrangement and types of components utilized in this invention may be subject to numerous modifications well within the purview of this inventor, who intends only to be limited to a liberal interpretation of the specification and appended claims.

What is claimed is:

1. A high clearance frame for a vehicle comprising; a front wheel support assembly, a rear wheel support assembly, a body support frame assembly pivotally suspended from one of said wheel support assemblies and rigidly suspended from the other of said wheel support assemblies, and means extended between said front and rear wheel support assemblies to maintain said assemblies in spaced relationship, said means including rigid means pivotally connected to said front and rear wheel assemblies and compression side brace means pivotally connected to said front and rear wheel support assemblies, said compression side brace means inclined downwardly from said one of said wheel support assemblies and having resilient means yieldably movable longitudinally of the brace means to absorb the stresses to which said high clearance frame is subjected.

2. A high clearance frame for a vehicle comprising; a front wheel support assembly, a rear wheel support assembly, a body support frame assembly pivotally suspended from said front wheel support assembly and rigidly suspended from said rear wheel support assembly, and means extended between said front and rear wheel support assemblies to maintain said assemblies in spaced relationship, said means including rigid side rail means pivotally connected to said front and rear wheel assemblies and compression side brace means pivotally connected to said front and rear wheel support assemblies, said compression side brace means having resilient means yieldably movable longitudinally of the brace means to absorb the stresses to which said high clearance frame is subjected.

3. A high clearance frame for agricultural vehicles comprising; a front wheel support assembly of inverted U-shape including a pair of elongated upright supports and a cross arm integrally connected to the upper extremities of said upright supports, a rear wheel support assembly of inverted U-shape including a pair of elongated upright supports and a cross arm integrally connected to the upper extremities of said upright supports, wheel means mounted at the lower extremities of the upright supports of said front and rear wheel support assemblies, a body support frame assembly pivotally suspended from the cross arm of said front wheel support assembly and rigidly suspended from the cross arm of said rear wheel support assembly, said body support frame extending rearwardly beyond said rear wheel support assembly to provide an overhanging section, said overhanging section acting to provide balanced suspension of said body support frame assembly from said front and rear wheel support assemblies, and means pivotally connected to and extending between said front and rear wheel support assemblies to maintain said assemblies in spaced relationship, said pivotally connected means including rigid side rails extending horizontally from pivotal connections adjacent the lower extremities of the elongated upright supports of said front and rear wheel support assemblies and compression braces extending downwardly from pivotal connections adjacent the upper extremities of the elongated upright supports of said front wheel support assembly to pivotal connections adjacent the lower extremities of the elongated upright supports of said rear wheel support assembly, said compression braces being contractible to absorb the stresses to which said high clearance frame is subjected.

4. A high clearance frame for a vehicle comprising, a front wheel support assembly, a rear wheel support assembly, a body support frame assembly pivotally suspended from said front wheel support assembly and rigidly suspended from said rear wheel support assembly, and means extended between said front and rear wheel support assemblies to maintain said assemblies in spaced relationship, said means including rigid side rail means pivotally connected to said front and rear wheel assemblies and compression side brace means pivotally connected to said front and rear wheel support assemblies, said compression brace means including, a first tubular section having a closed end and an open end, a second tubular section having an end section inserted for telescoping movement within the open end of said first tubular section, the inserted end section of said second tubular section having a centrally apertured end wall, a rod unit secured within said first and second tubular sections, said rod unit extending centrally through said first tubular section and said apertured end wall into said second tubular section and being capable of sliding movement relative to the end wall of said second tubular section, and compression spring means surrounding said rod, said compression spring means abutting the closed end of said first tubular section and the apertured end wall of said second tubular section to oppose telescoping movement of said second tubular section within said first tubular section.

5. The high clearance frame of claim 4 in which said body support frame assembly extends rearwardly beyond said rear wheel support assembly to provide an overhanging section, said overhanging section acting to provide balanced suspension of said body support frame assembly from said front and rear wheel support assemblies.

6. A high clearance frame for a vehicle comprising, a front wheel support assembly of inverted U-shape including a pair of elongated upright supports and a cross arm connected to the upper portions of said supports, a rear wheel support assembly of inverted U-shape including a pair of elongated upright supports and a cross arm connected to the upper portions of said upright supports, wheel means mounted on the lower sections of the upright supports of said front and rear wheel support assemblies, and means pivotally connected to and extending between said front and rear wheel support assemblies to maintain said assemblies in spaced relationship, said pivotally connected means including rigid side rails extended from pivotal connections secured to the upright supports of said front and rear wheel support assemblies and brace means extended from pivotal connections secured to the upright supports of said front and rear wheel support assemblies, said brace means having resilient means yieldably movable longitudinally of the brace means to absorb the stresses to which said frame is subjected.

7. A high clearance frame for a vehicle comprising, a front wheel support assembly including upright support means, a rear wheel support assembly including upright support means, wheel means mounted on the lower sections of the upright support means of said front and rear wheel support assemblies, means extended between said front and rear wheel support assemblies to maintain said assemblies in spaced relationship, said means including rigid means pivotally connected to the upright support means of said front and rear wheel support assemblies above the lower sections thereof, and brace means pivotally connected to the upright support means of said front and rear wheel support assemblies at positions spaced from pivotal connections, said brace means including resilient means yieldably movable longitudinally of the brace means to absorb the stresses to which the frame is subjected.

8. A high clearance frame for a vehicle comprising, a front wheel support assembly, a rear wheel support assembly, rigid means extended between said front and rear wheel support assembly to maintain said assemblies in spaced relationship, means pivotally connecting the rigid means to said front and rear wheel support assemblies, brace means spaced from said rigid means and extended between said front and rear wheel support assemblies, said brace means having resilient means yieldably movable longitudinally of the brace means to absorb the stresses to which the frame is subjected, means pivotally connecting the brace means to said front and rear wheel support assemblies, and wheel means operatively connected to said front and rear wheel support assemblies and positioned to one side of said rigid means and said brace means.

9. The frame defined in claim 8 wherein said brace means is angularly positioned relative to said rigid means.

References Cited in the file of this patent

UNITED STATES PATENTS

| 272,227 | Foreman | Feb. 13, 1883 |
| 780,577 | Rawson | Jan. 24, 1905 |
| 1,066,034 | Nauts | July 1, 1913 |
| 1,058,588 | Hubbard | Apr. 8, 1913 |
| 1,414,123 | Garson | Apr. 25, 1922 |
| 2,317,606 | Harris | Apr. 27, 1943 |
| 2,490,485 | Spaeth | Dec. 6, 1949 |

FOREIGN PATENTS

| 82,195 | Sweden | Dec. 11, 1934 |